United States Patent [19]

Beaudry et al.

[11] Patent Number: 5,357,451

[45] Date of Patent: Oct. 18, 1994

[54] DIGITAL SYSTEM CONTROLLER WITH PROGRAMMABLE RANGES FOR ANALOG SPEEDOMETER AND TACHOMETER GAUGES

[75] Inventors: James T. Beaudry, Plymouth; Ivan A. Pacek, Saline; John D. Acker, Clarkston, all of Mich.

[73] Assignee: Ford Motor Company, Dearborn, Mich.

[21] Appl. No.: 1,610

[22] Filed: Jan. 7, 1993

[51] Int. Cl.[5] ............................................. G01P 1/04
[52] U.S. Cl. ...................................... 364/561; 324/166; 377/24.1; 377/44; 377/47; 377/52
[58] Field of Search ................ 324/160, 166; 364/561; 377/24, 24.1, 44, 47, 52

[56] References Cited

U.S. PATENT DOCUMENTS

| | | | |
|---|---|---|---|
| 3,832,640 | 8/1974 | Cederquist et al. | 328/38 |
| 3,946,311 | 3/1976 | Baker et al. | 324/167 |
| 4,140,970 | 2/1979 | Graziano | 377/24.1 X |
| 4,167,699 | 9/1979 | Baker | 364/565 X |
| 4,199,719 | 4/1980 | Grob | 377/44 X |
| 4,216,419 | 8/1980 | van Dam et al. | 318/327 |
| 4,230,984 | 10/1980 | Taylor | 324/115 |
| 4,268,792 | 5/1981 | Grob | 328/24 |
| 4,350,952 | 9/1982 | Holt et al. | 377/47 X |
| 4,356,445 | 10/1982 | Congdon | 324/82 |
| 4,491,007 | 1/1985 | Crowdes, Jr. | 73/2 |
| 4,556,885 | 12/1985 | Kurosawa | 324/167 X |
| 4,779,213 | 10/1988 | Luitje | 364/565 |
| 4,918,629 | 4/1990 | Hackelman et al. | 364/550 X |
| 4,939,659 | 7/1990 | Moran et al. | 364/569 X |
| 4,939,675 | 7/1990 | Luitje | 364/550 |
| 4,988,944 | 1/1991 | Ito | 324/143 X |
| 5,001,930 | 3/1991 | Glover et al. | 73/493 |
| 5,017,861 | 5/1991 | Hukuda | 324/143 |
| 5,018,087 | 5/1991 | Dannenberg | 364/571.01 |
| 5,063,344 | 11/1991 | Linke | 324/115 |
| 5,105,150 | 4/1992 | Liu | 324/160 |
| 5,231,597 | 7/1993 | Komatsu | 377/24.1 X |

Primary Examiner—Edward R. Cosimano
Attorney, Agent, or Firm—Richard D. Dixon; Roger L. May

[57] ABSTRACT

A method and apparatus for improving the speed of response and display accuracy of a periodic input signal, of the type having a widely variable frequency, on an analog gauge have a meter deflection representative of the frequency of the input signal. Frequency scaling means are provided for multiplying the frequency of the input signal by a first constant to generate an intermediate signal. Counting means are coupled to the frequency scaling means for counting the frequency of the intermediate signal for a time period which is directly proportional to the maximum sweep deflection arc of the gauge times a second constant, and is inversely proportional to the maximum expected frequency of the input signal. Meter driver means coupled to the counting means are provided for deflecting the meter proportional to the counted intermediate signal frequency.

12 Claims, 2 Drawing Sheets

DIGITAL SYSTEM CONTROLLER WITH PROGRAMMABLE RANGES FOR ANALOG SPEEDOMETER AND TACHOMETER GAUGES

BACKGROUND OF THE INVENTION

1. Field of the Invention

The present invention relates to a system for digitally measuring a vehicle parameter, such as vehicle speed or engine rpm and displaying the measurement on an analog gauge. More particularly, the present invention relates to a method and system whereby a variety of analog gauges with a multiplicity of programmable sweep and full scale ranges can be calibrated easily for use in a wide range of vehicle applications.

2. Description of the Prior Art

Several prior art references utilize a microprocessor and software for developing signals that are used to drive an air-core gauge in a speedometer or tachometer system. While microprocessor or microcontroller driven systems may exhibit reduced manufacturing costs, the cost of software development and changes required to support a multiplicity of different vehicle designs, engine and transmission combinations, wheel sizes, etc. demands a large investment in software and careful control of the manufacturing process wherein the software is inserted into the microprocessor. An example of a multiple microcontroller system for calibrating and displaying engine rpm and wheel speed is disclosed by Moran et al in U.S. Pat. No. 4,939,659.

Another approach found in the prior art is disclosed by Congdon in U.S. Pat. No. 4,356,445 which utilizes discrete digital electronics for generating sine and cosine signals in sync with the input signal for driving an air-core meter movement.

One approach often used by systems employing the direct digital approach teaches the measurement of time-based events by counting the individual events for a fixed period of time determined by the full-scale frequency (either the speed or rpm) in the desired sweep range (deflection in degrees) of the meter. Both of these constants must be programmed into the discrete electronics of the system and are therefore difficult to change.

Unfortunately, the frequency range of the signal is usually incompatible with the desired response time of the instrumentation system and drivers. For example, with a typical speed sensor output of 2.22 Hz/mph and using a 270° deflection gauge for registering a maximum speed of 85 mph, the period of time required to achieve a $\frac{1}{2}$° resolution accuracy is approximately 1.5 seconds. Under these assumptions the electronics only will update the data value approximately every 1.5 seconds, which is well beyond the 50 millisecond update period normally required to achieve the appearance of continuous movement in the gauge. While it may be possible to use sensors having a much higher frequency output per revolution, these sensors are much more expensive and are bandwidth limited when the rotational speed of the axle or the engine crankshaft approaches very high levels.

In contrast to these prior art references, the present measurement system uses digital signal electronics that provide greater accuracy, linearity, monotinicity and speed of response than do conventional analog gauges. The present invention incorporates user program functionality for sweep, range, sender interface (either an 8-pole or VRS for the speedometer or 4/6/8 cylinder set-ups for the tachometer), and pointer placement offset for end of manufacturing line calibration. This programmability allows for a generic speedometer/tachometer electronics board to be manufactured and programmed for the application at final assembly and test. This commonality of design greatly reduces parts inventory, board inventory, and manufacturing complexity. In the preferred embodiment, up to 1024 possible design combinations can be accommodated with a single speedometer/tachometer electronics board.

SUMMARY OF THE INVENTION

The present invention contemplates an automotive electronic system having an improved speed of response and accuracy for displaying the frequency of a periodic input signal having a widely variable frequency over the total deflection arc of the analog gauge. An intermediate signal is generated by multiplying the frequency of the input signal by a first constant. The intermediate signal frequency then is counted over a time period that is directly proportional to the maximum sweep deflection arc of the meter times a second constant, and inversely proportional to the maximum expected frequency of the input signal. The deflection of the analog gauge is then driven proportional to the counted intermediate signal frequency. Both the first constant and the second constant are adjustable in order to optimize the maximum frequency that may be displayed over the maximum total deflection arc of the analog gauge.

It is therefore a first object of the present invention to provide a highly accurate frequency measuring system for use in a speedometer and tachometer system that will have the capability of offsetting static errors and will be free from linearity errors. The system must have a fast response time so that the driver perceives no lag in the movement of the meter. This fast response time must be shorter than 50 milliseconds, even when the input data frequency rate is relatively low.

Another object of the present invention is to provide a high degree of accuracy for both a speedometer, which must measure speeds accurately from 0 mph to above 120 mph, and for a tachometer which must measure rpm accurately from several hundred rpm to well over 10,000 rpm. Each of these circuits must perform on a wide variety of analog gauges having maximum deflection arcs of from 90° to as much as 270°.

BRIEF DESCRIPTION OF THE DRAWINGS

Other objects, features and advantages of the present invention will be apparent from a study of the written description and the drawings in which.

DETAILED DESCRIPTION OF THE PREFERRED EMBODIMENT

Figure 1:
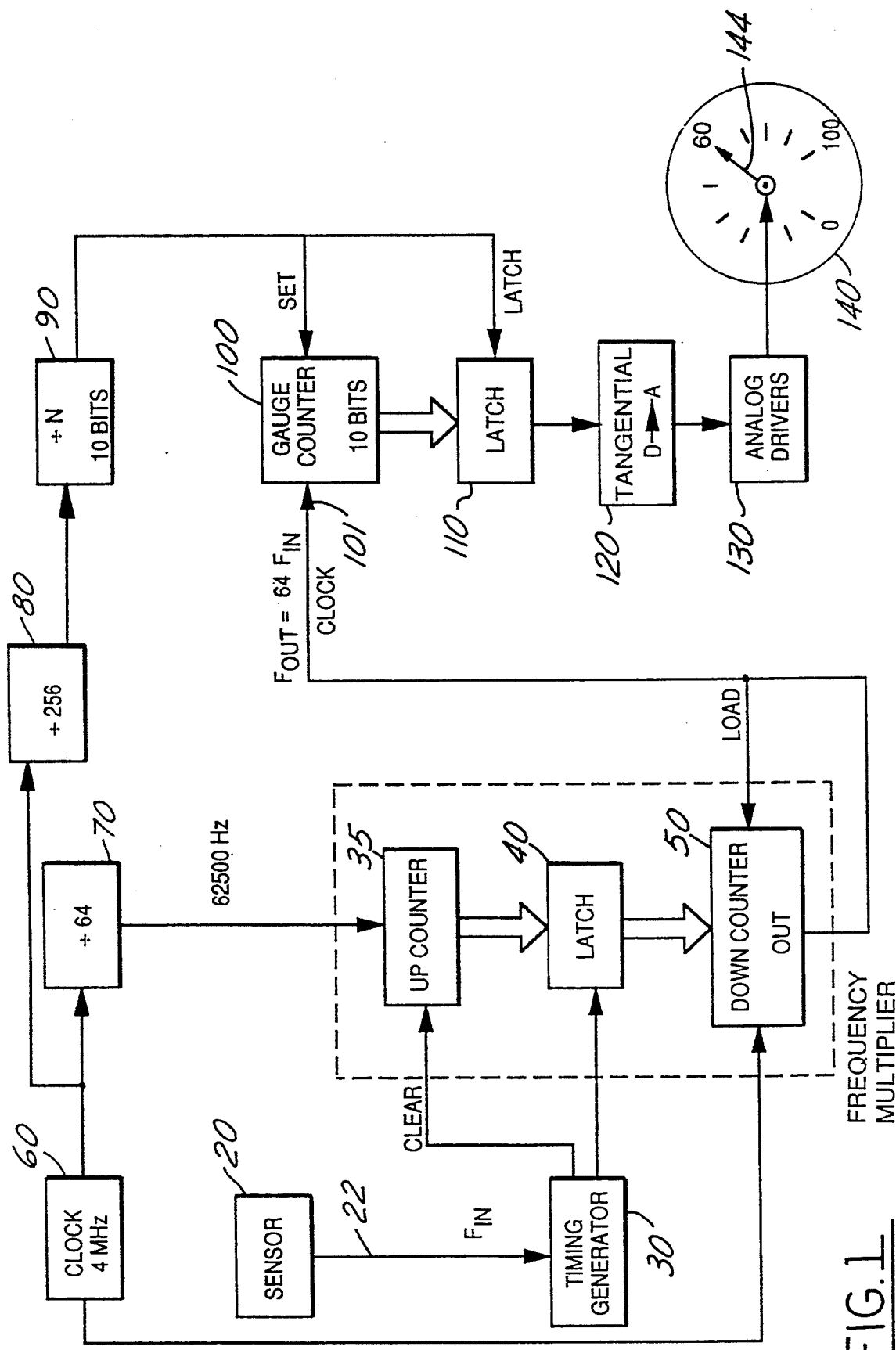
FIG. 1 illustrates a simplified schematic block diagram of a speedometer system in accordance with the present invention.

With reference to FIG. 1, an 8-pole sensor unit 20 is provided in the transmission of the vehicle for sensing rotational speed of the axle or transaxle, which is directly proportional to the speed of the wheels driving the vehicle. A VRS (variable reluctance sensor) input of the type used in an antilock braking system is capable of being processed by the system inaccordance with the first preferred embodiment. While the frequency of the VRS sensor signal is approximately 11.11 Hz/mph, the preferred embodiment uses the 8-pole sensor which provides a frequency of 2.22 Hz/mph. This frequency is designated as F(in) at the conductor connecting the sensor 20 to the input of a timing generator 30. As a practical matter, it is possible to reduce the higher frequency from the VRS sensor to the same frequency and sensitivity as the 8-pole sensor merely by passing the VRS signal through a divide by 5 circuit. Other ratios may be accommodated by scaling the multiply/divide circuits and paths in a manner similar to that which will be explained subsequently.

In the timing generator 30, each leading edge of the input signal from the sensor 20 will generate a latch signal that will cause a latch 40 to fetch the value from the up counter 35 and to retain it within the latch 40. After the data has been stored in the latch 40, timing generator 30 sends a clear signal which will reset the value of the up counter 35 to zero. As a practical matter, if F(in) is 50% duty cycle, each edge, rising and falling, could be used in the timing generator effectively doubling the input frequency. This could prove beneficial in optimizing the accuracy or response characteristics.

The up counter 35 accumulates the counts from a 62,500 Hz signal that is developed by taking the 4 MHz output from the master clock 60 and processing it through a divide by 64 counter 70. After the up counter 35 is cleared, it accumulates the clock pulses until the accumulated value is transferred to the latch 40, which occurs when the next positive edge of the input signal is detected by the timing generator 30. The value in the up counter 35 is then transferred to the latch 40, and the value in latch 40 is transferred to the down counter 50. In the same manner the down counter 50 will proceed to count downward from the value transferred from the latch 40 in the previous step, but at a clock rate of 4 MHz which is derived directly from the master clock 60. It should be apparent that the countdown in the down counter 50 will precede exactly 64 times faster than the accumulation of the pulses in the up counter 35 due to the ratio of the clock frequencies.

When the down counter 50 reaches zero for the first time, it sends an output pulse from the out port to a first input 101 of a gauge counter 100. At the same time, the output pulse from the down counter 50 triggers a load signal into another input of the down counter 50 which in turn causes the previous value of the latch 40 to be down loaded into the down counter 50. The down counter 50 counts down at the rate of 4 MHz, and thereby generates an output having the form of a series of pulses that occur exactly 64 times the frequency of the input signal from the sensor 20.

The operation of the frequency multiplier (which includes the up counter 30, the latch 40, and the down counter 50) is more fully described in U.S. Pat. No. 3,832,640 which is assigned to the owner of the present invention, and which is incorporated herein by its reference. In essence, the resulting output signal from the frequency multiplier occurs at a rate which is equal to the frequency of the input signal multiplied by the desired multiplier factor.

Therefore, the period during which the up counter 35 accumulates pulses from the 62.5 kHz clock, and during which the down counter 50 counts downward at a 4 MHz clock rate, is equal to the period (one over the frequency) of the input signal from the sensor 20.

The signal at the input 101 of the gauge counter 100 is counted at a clock rate provided by the down counter reaching zero or 64× F(in), and varies directly in relationship to the vehicle speed. The value in the gauge counter 100 is latched in latch 110 at a rate that varies according to the system parameters programmed for the particular embodiment utilized in the vehicle. The latch input frequency is determined by taking the 4 MHz signal from the master clock 60 and dividing that signal in the divider 80 by a factor of 256. The output from the divider 80 is then divided again in divider 90 by a constant N. The value for the constant N varies in each embodiment directly in accordance with the maximum degrees of sweep for the pointer in the analog gauge, and inversely in accordance with the maximum speed to be displayed (which will correspond to the maximum deviation of the pointer on the analog gauge). Since the divide by N counter 90 is a 10 bit counter, the maximum deflection of an analog gauge (360°) will correspond to the maximum number of bits discernible by the counter 90 (1024 bits). Since 1024 bits is equal to 360°, the value of N is directly proportional to the arc swept by the pointer of the analog gauge. In this manner if the desired deflection of the analog gauge is 180° (360° divided by 2), then the value of N must be 1024 bits divided by 2 or 512 bits. This results in a resolution of 0.35°/bit.

Given the constants that have been utilized in the first preferred embodiment of the present invention, namely that F(in)=2.22 Hz/mph, the equation for N may be stated as follows:

$$N = \frac{313 \times SWEEP°}{SPEED_{max}}$$

Therefore, the series of pulses from the output of the counter 90 will be translated to the input 110 of the latch 110 and the clear or set of the gauge counter 100, and each pulse at the input will define the period of time during which the clock pulses from the down counter 50 are accumulated. The period time during which the clock pulses are counted is a variable that is determined for each embodiment depending upon the number of degrees of arc swept by the pointer in the air-core gauge for full scale deflection and maximum indicated speed.

When another pulse appears at the input of the latch 110, the present value of clock pulses accumulated within the counter 100 will be frozen and transferred to a latch 110. The counter 100 is then cleared. Therefore, the value retained in the latch 110 will be a digital representation of the speed of the vehicle and will be updated at least every 40 milliseconds.

The digital value within the latch 110 can be processed in several ways, including as a PWM signal, as a sine/cosine signal using ROMs and DACs, a tangential DAC, or as in the preferred embodiment as a tangent ROM and linear DAC (with the 10 bit value being split into a 3 bit octant decoder and a 7 bit (0–127) ROM address). It also would be possible to take the output of the latch 110 and transfer it directly to drive a digital display.

The output of the tangential D/A converted 120 is coupled to analog drivers 130 that amplify and condition the signal and then apply it to an air-core gauge 140 having a movable pointer 144 thereon. The pointer 144 traverses an arc starting at zero and ending at full scale 100. This sweep defines an arc of approximately 270° in the preferred embodiment. Other air-core gauge models may be utilized having sweep arcs of 90°, 180° and as much as 360°, or any intermediate value determined by N. It should be noted that counter 70 may be incorporated within counter 80 and counters 80 and 90 may be concatenated to provide more programmability (i.e. N less than or equal to 183175), thus providing a finer resolution at the expense of a larger value for N, thereby requiring a larger number of programming bits to be available.

Figure 2:
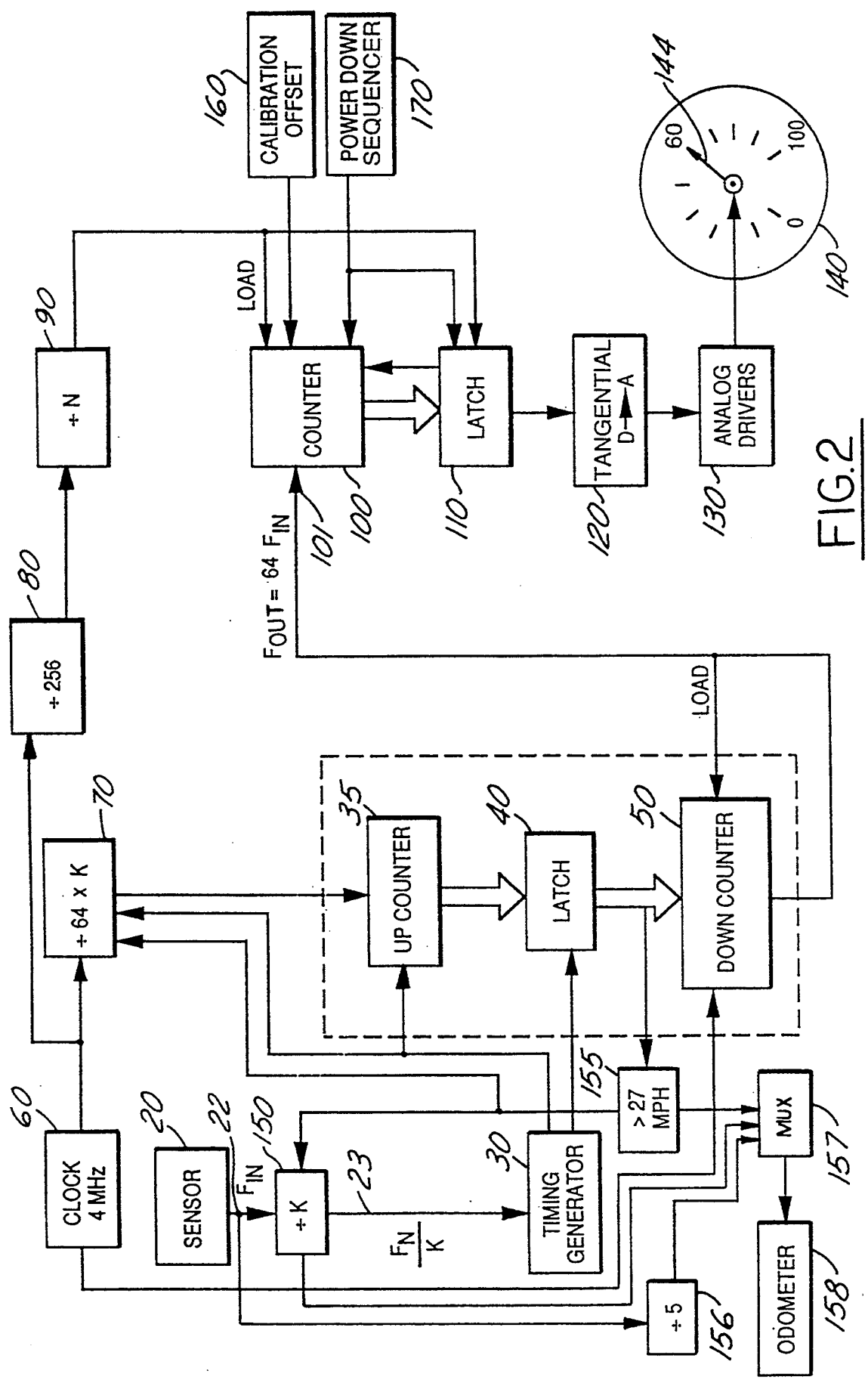
FIG. 2 illustrates a complete schematic block diagram of the present invention illustrating the calibration adjustments and the anticogging filters.

FIG. 2 illustrates a more detailed representation of improvements made to the first preferred embodiment. Another divider 150 is inserted in the signal line 22 between the sensor 20 and the timing generator 30 for dividing the frequency of the input signal by another constant K, which in the first preferred embodiment is equal to eight. The constant eight was chosen in order to reduce the potential for frequency modulation in the 8-pole sensor signal from the transmission of the vehicle, such as could be caused by unequal spacing of the pole pieces in the sensing element. Therefore, instead of having eight pulses per revolution of the shaft being sensed, the output signal on line 23 from the divider 150 will have the frequency of Fn divided by K.

The divider 150 is not actuated until the output from latch 40 exceeds approximately 27 mph, at which time a logic element 155 will enable the divider 150 to begin operation. This ensures adequate response at low speeds where the input frequency is low, but filters the signal at speeds where frequency modulation would be objectionable. At the same time the output of logic element 155 changes the operation of the divider 70 from a divide by 64 function to a divide by 64 times K (or the equivalent of a divide by 512 function). Since the output of divider 70 is coupled to up converter 30, the effect of dividing the input signal frequency by K in divider 150 will be cancelled out by dividing the clock frequency by eight in divider 70, and F(out) will equal 64 F(in) for all cases.

This divider 150 is enabled at a speed greater than 27 mph in order to minimize any frequency modulation that may occur in the signal from the sensor 20 due to the uneven spacing of the eight poles about the rotational axis.

With continuing reference to FIG. 2, the function of the calibration offset 160 can be explained as follows. First, the input from sensor 20 is set at a simulated speed of 60 mph, and the position of the pointer 144 on the analog gauge 140 is noted. Any deviation of the pointer from the intended 60 mph mark is cancelled by inserting a static offset value from the calibration offset 160 into the counter 100 at the start of the counting period. If the position of the pointer 144 is less than 60 mph, a positive calibration offset is inserted in order to advance the pointer to the correct value at the end of the period counted by the down counter 50. The value of the static calibration offset 160 can absorb any accumulation of errors or offsets within the electronics or the mechanical portions of the gauge 140.

In the preferred embodiment these offset calibrations are programmed by using high current pulses for trimming internal polysilicon resistors in the IC containing these digital circuits, which is a custom ASIC manufactured by Philips/Signetics. The polysilicon resistor values are sensed and decoded to provide the desired constants. A serial data input is used in this process. The polysilicon resistors are programmed at the final system manufacturing location through the use of a current loop in a serial data interface. This programming method minimizes chip area and pin count. However, the programming of could be accomplished by several different methods, including internal programmable fuses, EEPROMS, EPROMS, external pins, or any other method that provides for the programming of similar variables.

A power down sequencer 170 is coupled to both the gauge counter 100 and the latch 110 for use when powering down the system. Assume first that the gauge is presently deflected 200° from the zero point. Normal gauges would utilize spring tension or some other reverse biasing means to return the pointer to the zero position when power is removed, but these biasing means cause nonlinearities in the normal operation of the gauge and significantly reduce the efficiency of the mechanism. The present invention does not use such reverse biasing means, but instead uses the power down sequencer 170 to sense the withdrawal of power from the system. At powerdown the sequencer 170 transfers the value from the latch 110 into the counter 100, and then changes the counter 100 from an up counter to a down counter. A fast clock signal then is used to count down from the last latch value to zero. During this mode the latch is transparent so that its output follows the counter values and drives the gauge directly. The output of the latch 110 is used by the tangential D/A converter 120 and the analog drivers 130 to drive the pointer 144 to zero. In order to make the speed of this transition acceptable to the driver, the clock rate may be adjusted so that the rate of movement of the pointer 144 toward the zero stop approaches the maximum speed of movement of the pointer.

The divider 150 (divide by K) is implemented in the preferred embodiment as a divide by 8 function. The signal from the sensor 20 is also directed to the input of a divider 156 that is implemented as a divide by 5 circuit. An input of a multiplexor 157 is coupled to the output of the divider 156 and the output of the divider 150 in order to provide a programmable switch for incrementing the output signal to an odometer 158. If the mux 157 is selected to the output of the divider 150 (divide by 8), then the signal to the odometer 158 is 1000 pulses per mile. If the mux 157 is selected to the output of the divider 156 (divide by 5), then output is 1000 pulses /km. In the event that the filter is not needed or is a value other than 8, a separate divide by 8 circuit would be required. An alternative would be to use a single counter that could divide by either 8 or 5 according to a selectable, programmable input signal.

The preferred embodiment of the present invention may be modified in order to operate as a tachometer rather than a speedometer and odometer. According to this modification, the sensor 20 is replaced by a direct signal from either an electronic engine control unit or an ignition control unit, with the signal being directly proportional to the firing of the spark plugs in the engine. In order to adjust for the cases in which the engine may be a four cylinder, six cylinder or eight cylinder engine, a programmable divider circuit would be substituted for divider 70 that is coupled to the latch 40. The divider 70 would be adjusted to divide by 60, 80 or 120 depending on whether the number of cylinders was 8, 6 or 4, rather than the divide by 64 that was utilized in the speedometer. Except for the scaling of the dividers, the remainder of the circuitry would be essentially the same. In the preferred tachometer embodiment wherein divider 80 is scaled to 128 instead of 256, the formula for N becomes:

$$N = \frac{22,222 \times SWEEP°}{RPM_{max}}$$

This value of N may be adjusted depending upon the maximum value of the rpm signal expected and the sweep available in the air-core gauge.

In summary, one skilled in the art will recognize trade offs that are involved in the design of the speedometer and tachometer embodiments. In the preferred design of the speedometer the lowest speed registered is 3.4 mph, with a resolution of 1.4 mph at 200 mph, and an update rate of 0.064N ms. The preferred embodiment for the tachometer is slightly different since the signals representative of the engine rpm are of significantly higher frequency than the signals representative of the speed of the vehicle. The lowest rpm registered is 228 rpm, with a resolution of 72 rpm at 8,000 rpm, and an update time of 0.034N ms. It should be recognized that by selecting the appropriate values of N, the speedometer could also be calibrated in km/hr, and other engines (e.g. 10 or 12 cylinders) could be accommodated by the circuits utilized in the preferred embodiment.

We claim:

1. A method for displaying a periodic input signal, having a widely variable frequency, on an analog gauge having a meter deflection over the total deflection arc representative of the frequency of the input signal, comprising the steps of:
   receiving the input signal,
   generating an intermediate signal, having a frequency substantially greater than the frequency of the input signal, by multiplying the frequency of the input signal by a first constant,
   counting the intermediate signal frequency for a time period that is directly proportional to the maximum sweep deflection arc of the meter times a second constant and inversely proportional to the maximum expected frequency of the input signal, and
   driving the deflection of the gauge proportional to the counted intermediate signal frequency, thereby causing a more accurate and responsive linear deflection of the gauge over the total deflection arc due to the higher frequency of the counted intermediate signal.

2. The method as described in claim 1 further including the preliminary step of adjusting said first and second consists so as to provide the maximum sweep deflection on the gauge at the maximum expected frequency of the input signal.

3. The method as described in claim 1 including the additional step of calibrating the gauge for any static offset from the desired value by counting the intermediate signal frequency starting with an offset constant developed to cancel the static offset.

4. The method as described in claim 1 further including the power down steps of:
   terminating the counting of the intermediate signal frequency and instead counting down to zero from the last intermediate signal frequency, whereby the gauge will decrease from the last displayed value toward zero.

5. The method as described in claim 4 wherein the count down rate is clocked at a rapid rate that is within the response time of the gauge whereby the gauge will approach zero at a speed approaching the maximum response time of the gauge movement.

6. The method as described in claim 1 wherein the step of generating said intermediate signal includes the step of reducing the frequency of the input signal through the use of a frequency divider, and also reducing the frequency of clock pulses used in generating said first constant by a corresponding divisor.

7. The method as described in claim 6 wherein the step of generating said intermediate signal also includes the step of dividing the input signal frequency by a constant equal to the number of poles used in the complete revolution of a sensor used to sense rotation of the shaft being sensed, and further including the step of dividing the resulting intermediate signal frequency by the same constant.

8. A system for displaying the frequency of a periodic input signal, having a widely variable frequency, over the total deflection arc of an analog gauge, comprising:
   frequency multiplying means for receiving and multiplying the frequency of the input signal by a first constant to generate an intermediate signal, having a frequency substantially greater than the frequency of the input signal, counting means, coupled to said frequency multiplying means, for counting the frequency of said intermediate signal for a time period directly proportional to the maximum sweep deflection arc of the meter times a second constant and inversely proportional to the maximum expected frequency of the input signal, and
   gauge driving means for driving the deflection of the gauge so as to be proportional to the counted intermediate signal frequency.

9. The system as described in claim 8 wherein the gauge is an air-core gauge.

10. The system as described in claim 8 wherein the system is operated as one of a speedometer and a tachometer.

11. The system as described in claim 8 wherein said first and said second constant includes means for adjusting said constants so as to provide maximum sweep deflection on the gauge corresponding to the maximum expected frequency of the input signal.

12. The system as described in claim 11 wherein said means for adjusting said first and said second constants includes:
   programmable resistors integral with said counting means, and
   programing means coupled to said resistors for programing said resistors according to said constants and responsive to the total deflection arc characteristics of the analog gauge and the maximum frequency of the input signal.

* * * * *